United States Patent [19]
Kuriki et al.

[11] Patent Number: 5,348,338
[45] Date of Patent: Sep. 20, 1994

[54] ACTIVE VEHICLE SUSPENSION SYSTEM

[75] Inventors: Nobuharu Kuriki; Seiji Ohsaki; Hideaki Shibue; Yoshiki Noro, all of Saitama, Japan

[73] Assignee: Honda Giken Kogyo Kabushiki Kaisha, Tokyo, Japan

[21] Appl. No.: 857,666

[22] Filed: Mar. 26, 1992

[30] Foreign Application Priority Data

Jun. 25, 1991 [JP] Japan ................................. 180254

[51] Int. Cl.$^5$ ........................................... B60G 17/015
[52] U.S. Cl. ................................. 280/707; 280/714
[58] Field of Search .................... 280/707, 709, 714

[56] References Cited

U.S. PATENT DOCUMENTS

| | | | |
|---|---|---|---|
| 4,779,895 | 10/1988 | Rubel | 280/707 |
| 5,015,009 | 5/1991 | Ohyama et al. | 280/707 |
| 5,110,152 | 5/1992 | Jones | 280/707 |
| 5,135,065 | 8/1992 | Kawasaki | 280/714 |
| 5,137,299 | 8/1992 | Jones | 280/707 |

FOREIGN PATENT DOCUMENTS

| | | | |
|---|---|---|---|
| 3638574 | 5/1988 | Fed. Rep. of Germany | 280/714 |
| 62-1611 | 1/1987 | Japan . | |

*Primary Examiner*—Karin L. Tyson
*Attorney, Agent, or Firm*—Irving M. Weiner; Joseph P. Carrier; Pamela S. Burt

[57] ABSTRACT

In an hydraulic active vehicle suspension system using a linear hydraulic cylinder as a primary actuator, controlled hydraulic pressure is supplied to an upper chamber of the hydraulic cylinder defined by a smaller pressure receiving surface of the piston and the cylinder while a reduced and fixed pressure is supplied to a lower chamber of the hydraulic cylinder defined by a larger pressure receiving surface of the piston and the cylinder, and an accumulator is connected to the lower chamber so that a desired hydraulic actuation can be accomplished by the controlled hydraulic pressure while sudden forces or inputs containing high frequency components applied to the lower chamber are absorbed by the accumulator. Thus, the accumulator offers a favorable response to the wheel riding over a bump or otherwise experiencing sudden movements and the absence of any accumulator connected to the upper chamber ensures a high speed response property of the system without requiring a large power capacity of the pump serving as the pressure source for the system.

15 Claims, 3 Drawing Sheets

ACTIVE VEHICLE SUSPENSION SYSTEM

TECHNICAL FIELD

The present invention relates to an active vehicle suspension system in which a hydraulic actuator is coupled between each wheel and the vehicle body.

BACKGROUND OF THE INVENTION

There are a number of known active vehicle suspension systems which actively control the vertical relative movement between each wheel and the vehicle body with a linear hydraulic actuator according to the condition of the road surface and the movement of the vehicle body. An example of an active vehicle suspension system is disclosed in Japanese patent laid open publication No. 62-1611.

A typical linear hydraulic actuator employed in such an active vehicle suspension system comprises a piston slidably received in a cylinder, defining two hydraulic chambers, and a desired relative movement between the piston and the cylinder is produced by the difference in the hydraulic pressures present in these two chambers. Normally, the piston is provided with a piston rod which extends axially from one end of the cylinder so that the piston presents two pressure receiving surfaces having different areas to the two hydraulic chambers.

Typically, a bottom end of the cylinder is coupled to the wheel and an outer end of the piston rod is coupled to the vehicle body. Further, the output from a hydraulic pump is directly supplied to one of the hydraulic chambers (upper chamber) exposed to the surface receiving surface of the piston having the smaller area, and a feedback control is carried out on the pressure of the other hydraulic chamber (lower chamber) via a pressure control valve according to the displacement of the hydraulic actuator and the change rate of the displacement so that the wheel may closely follow the road surface and the height of the vehicle body may be maintained at a fixed level.

However, since the pressure control valve normally consisting of a solenoid valve involves a certain response delay, the vehicle suspension system may not be able to adapt itself to a high frequency component of the input from the road surface, and a surging may be developed in the pressure applied to the lower chamber in extreme cases. To eliminate this problem, in most active vehicle suspension systems, a gas-filled accumulator is connected to the line between the pressure control valve and the lower chamber so that the high frequency component of the pressure change the lower chamber may be passively absorbed by the accumulator. Additionally or alternatively, a relief valve is connected to this line so that excessive pressure in the hydraulic actuator may be safely vented.

In such a hydraulic system, the presence of an accumulator in the output line of the pressure control valve tends to impair the response speed of the system, and increasing the response speed of the system requires a pump having a relatively large capacity. Further, a relief valve is not capable of venting excess pressure unless there is a substantial difference in pressure between the upper and lower chambers.

BRIEF SUMMARY OF THE INVENTION

In view of such problems of the prior art, a primary object of the present invention is to provide an active vehicle suspension system which is capable of favorably absorbing high frequency components by using a conventional double-acting linear hydraulic actuator.

A second object of the present invention is to provide an active vehicle suspension system which has a favorable response property without requiring a pump having a large power output.

These and other objects of the present invention can be accomplished by providing an active vehicle suspension system, comprising: a hydraulic actuator disposed between a wheel and a vehicle body, the actuator including a cylinder and a piston slidably received therein, the piston dividing an interior of the cylinder into first and second chambers which are defined by first and second pressure receiving surfaces of the piston, respectively, in cooperation with the cylinder; a pressure source; a first line connecting the pressure source to the first chamber; a control valve for controlling a pressure supplied from the pressure source to the first chamber of the cylinder; a second line connecting the pressure source to the second chamber; pressure reducing means provided in the second line for reducing a level of pressure supplied from the pressure source to the second chamber to a level lower than a maximum pressure which the control valve can supply to the first chamber; and an accumulator connected to the second line; the first pressure receiving surface being substantially smaller than the second pressure receiving surface.

According to the present invention, the controlled hydraulic pressure is supplied to the upper chamber while a reduced and fixed pressure is supplied to the lower chamber, and an accumulator is connected to the lower chamber so that a desired hydraulic actuation can be accomplished by the controlled hydraulic pressure while sudden forces or inputs containing high frequency components applied to the lower chamber are absorbed by the accumulator. Thus, a sudden input to the wheel produced, for instance, by the wheel riding over a bump on the road surface is conveniently absorbed by the accumulator without requiring the hydraulic actuator to respond to high frequency inputs. Therefore, a desired response property can be achieved without requiring a high capacity pump.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
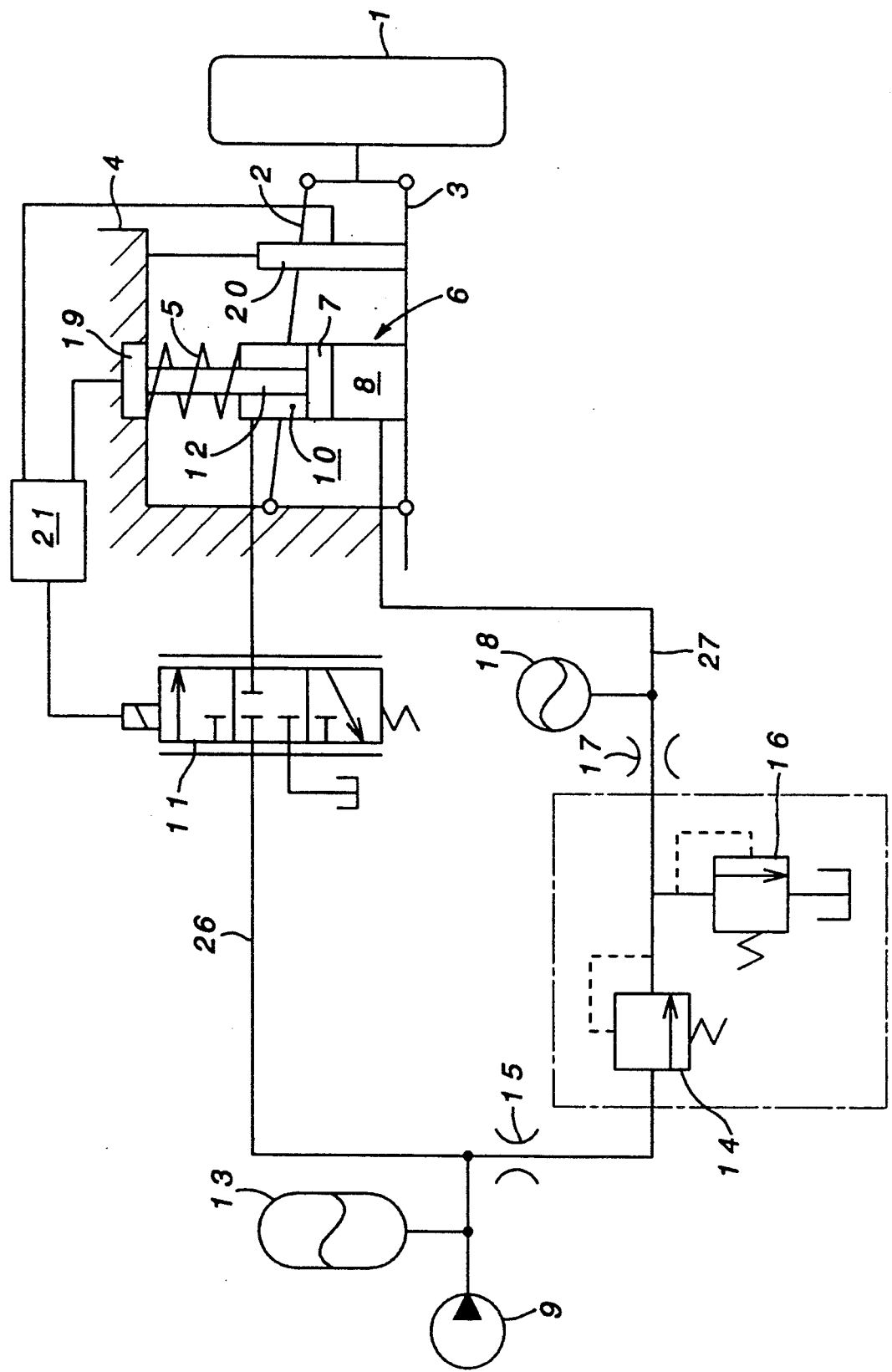
FIG. 1 is a diagram illustrating the overall structure of an embodiment of the active vehicle suspension system according to the present invention.

Referring to FIG. 1 showing the overall structure of the preferred embodiment of the active vehicle suspension system according to the present invention, a wheel 1 is supported by a vehicle body 4 in a vertically moveable manner via upper and lower suspension arms 2 and 3. A compression coil spring 5 and a linear hydraulic actuator 6 are connected between the lower suspension arm 3 and the vehicle body 4 in a parallel relationship.

The hydraulic actuator 6 is constructed as a linear hydraulic cylinder comprising a piston 7 slidably received in a cylinder, and an output from a hydraulic pump 9 is supplied to a lower hydraulic chamber 8 via a second supply line 27 including a pressure reducing valve 14. The output of the hydraulic pump 9 is also supplied to an upper chamber 10 of the cylinder via a first supply line 26 including a pressure control valve 11. Since the piston 7 is provided with two pressure receiving surfaces exposed to the two hydraulic chambers 8 and 10, respectively, and the areas of these two pressure receiving surfaces are different from each other by the cross sectional area of a piston rod 12 which is connected to the piston at its one end and extends out of the cylinder at its other end. Therefore, the piston rod 12 is subjected to a thrust or an axial force given by the difference in the forces acting on the two pressure receiving surfaces, each of the forces given by the product of the pressure of the corresponding chamber and the area of the pressure receiving surface exposed to the chamber in question, and this thrust movement of the hydraulic cylinder brings about the change in the relative distance between the wheel 1 and the vehicle body 4.

After removed of any pulsating components by a main accumulator 13, the output from the pump 9 is divided into the first and the second supply lines 226 and 27 which branch off from each other, and the first supply line 26 is connected to the upper chamber 10 of the actuator 6 via the pressure control valve 11 while the second supply line 27 is connected to the lower chamber 8 of the actuator 6 via the pressure reducing valve 14 for controlling the pressure of the line at a level somewhat lower than the output pressure from the pump 9. An orifice 15 is provided in the line between the pump 9 and the pressure reducing valve 14, and a relief valve 16, a second orifice 17 and a second accumulator 18 are connected, in that order, in the part of the second supply line extending from the outlet end of the pressure reducing valve 14 to the lower chamber 8 of the actuator 6.

The pressure control valve 11 may consist of a known spool-type, three-port, three-position solenoid valve which can substantially continually control the pressure of the upper chamber 10 of the actuator 6 according to the current supplied to the solenoid. The polarity and the magnitude of the current supplied to the solenoid are controlled by a control circuit 21 according to outputs from the load sensor 19 provided between the piston rod 12 and the vehicle body 4, and the stroke sensor 20 provided between the vehicle body 4 and the lower suspension arm 3. Obviously, the control valve 11 may be controlled by an analog control, a duty ratio control or any other known technique.

Now the operation of this embodiment is described in the following.

The areas of the two pressure receiving surfaces of the piston 7 of the actuator 6 are determined so that:

$$A1 < A2$$

where A1 and A2 are the areas of the pressure receiving surfaces facing the upper chamber 10 and the lower chamber 8, respectively. The lower chamber 8 receives a constant pressure regulated by the pressure reducing valve 14. Therefore, when the pressures present in the upper and the lower chambers 10 and 8 are equal to each other, the piston rod 12 receives an upward thrust which tends to increase the distance between the vehicle body 4 and the wheel 1. When the pressure of the upper chamber 10 is reduced, this thrust is further increased in the direction to increase the distance between the vehicle body 4 and the wheel 1. Conversely, when the pressure of the upper chamber 10 is increased, the distance between the vehicle body 4 and the wheel 1 is reduced. Therefore, it is possible to achieve a desired operation of the hydraulic actuator simply by varying the pressure of the upper chamber 10.

The level of the thrust provided by the hydraulic actuator 6 is controlled basically as a feedback control according to the outputs from the stroke sensor 20 for detecting the relative distance between the wheel 1 and the vehicle body 4 and the load sensor 19 which detects the reaction force of the hydraulic actuator as it acts upon the wheel 1 in such a manner that a certain spring force and a damping effect may be produced. However, it is known that the response property of such a pressure control valve 11 declines sharply as the frequency of its control signal rises. In other words, if the frequency of the input from the wheel 1 gets higher than a certain level, the hydraulic actuator 6 may not be able to respond to it.

To eliminate such a problem, according to the present invention, when the input to the hydraulic actuator 6 is subjected to an oscillatory force from the wheel 1 whose frequency is higher than the response capability of the pressure control valve 11, the accumulator 18 connected to the lower chamber 8 absorbs such high frequency components. If the pressure in the lower chamber 8 is sufficiently high, the excess pressure may be removed by the relief valve 16.

The pressure control valve 11 can change the controlled pressure supplied to the upper chamber 10 of the actuator 6 from 0 to P0 when the output pressure from the pump is P0. If the pressure level of the upper chamber 10 at which the piston 7 of the actuator 6 is designed to be statically balanced is P0/2 and the pressure receiving surface areas of the piston facing the upper and lower chambers 10 and 8 are A1 and A2, respectively, then the pressure Ps of the lower chambers 8 for statically balancing the piston is given by the following:

$$Ps = (A1/A2) \cdot (P0/2)$$

To lower the wheel 1 or to extend the hydraulic actuator 6, the pressure of the upper chamber 10 is required to be reduced. As a result, the pressure Ps of the lower chamber 8 is temporarily reduced as given in the following:

$$Ps < (A1/A2) \cdot (P0/2) - \alpha$$

This temporary reduction in the pressure causes the pressure reducing valve 14 to open and the insufficiency in the pressure is compensated by the pump 9.

Conversely, to raise the wheel 1 or to retract the hydraulic actuator 6, the pressure of the upper chamber 10 is required to be increase. As a result, the pressure Ps of the lower chamber 8 is temporarily increased as given in the following:

$$Ps > (A1/A2) \cdot (P0/2) + \alpha$$

This temporary rise in the pressure causes the pressure relief valve 16 to open and the excessive pressure is vented from the lower chamber 8.

In other words, the pressure Ps of the lower chamber 8 can be controlled in the range given below by varying the pressure of the upper chamber 10 with the pressure control valve 11:

$$(A1/A2)\cdot(P0/2)-\alpha \leqq (A1/A2)\cdot(P0/2)+\alpha$$

The change in the component of the pressure change represented by $\pm\alpha$ is absorbed by the second accumulator 18. The orifices 15 and 17 give some hysteresis in the system connected to the output end of the pump, and prevent excessive reaction of the pressure reducing valve 14 and the relief valve 16.

The relief valve 16 can be omitted if a slight increase in the pressure of the lower chamber is acceptable.

Figure 2:
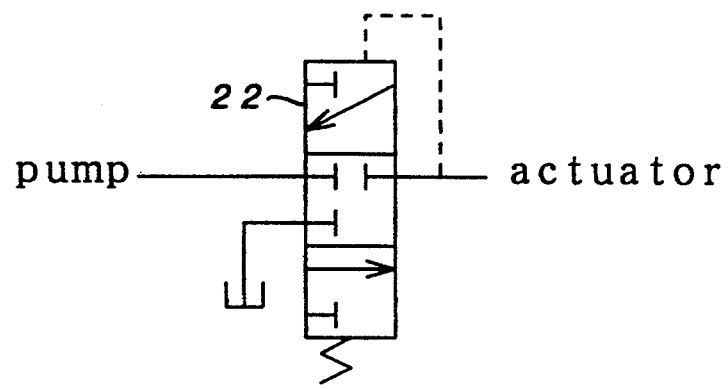
FIGS. 2 through 4 are hydraulic circuit diagrams showing different embodiments of the pressure reducing valve employed in the embodiment illustrated in FIG. 1.

FIG. 2 shows a second embodiment of the pressure reducing valve for maintaining the pressure of the lower chamber 8 within a prescribed range. In this embodiment, the pressure reducing valve consists of a pilot operated three-port, three-position spool valve which responds to the pressure of the lower chamber 8. In this case, the pressure of the lower chamber 8 is kept constant according to the set value of the pilot pressure.

Figure 3:
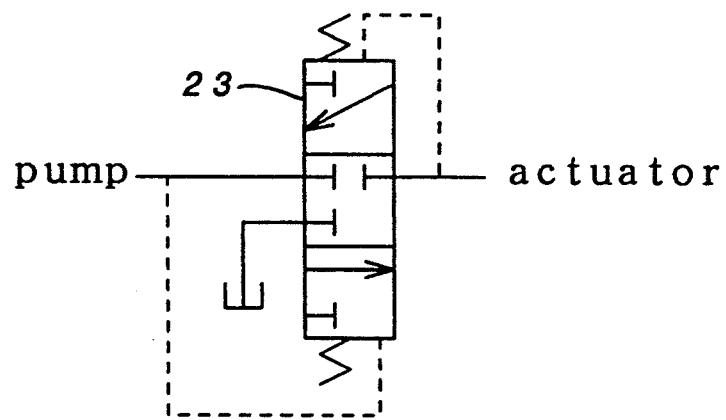

In the third embodiment illustrated in FIG. 3, the pressure reducing valve likewise consists of a pilot operated three-position, three-port spool valve, however, in which pilot pressures are derived from the output end of the pump 9 as well as from the lower chamber 8 so that the movement of the valve spool is controlled by the difference between the two pressures and the precision of the pressure control may be increased.

Figure 4:
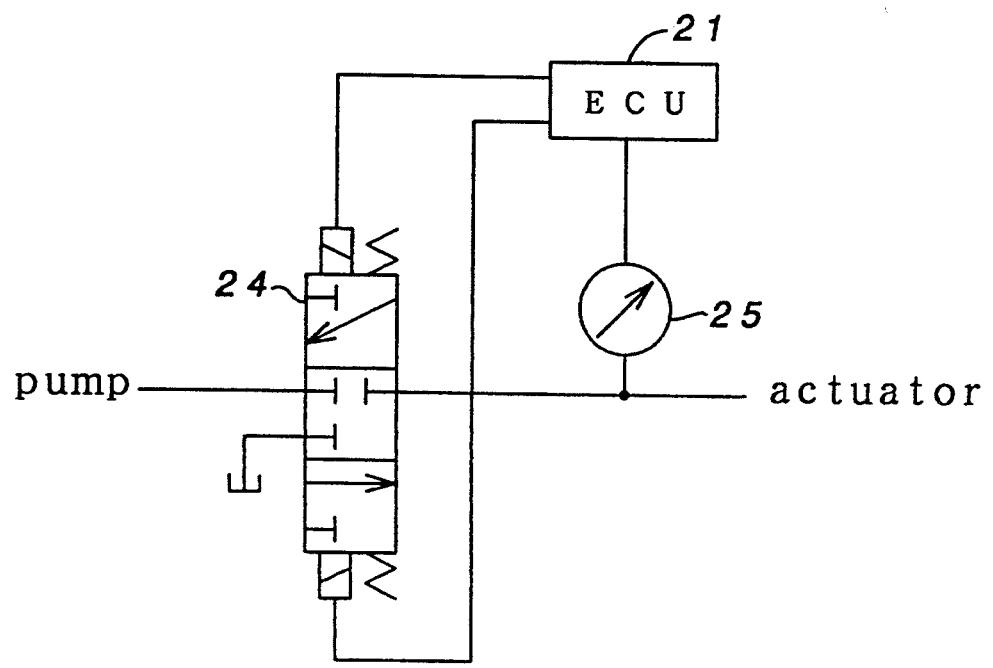

In the fourth embodiment illustrated in FIG. 4, the pressure reducing valve consists of a spring-centered solenoid valve 24 which is controlled by a control signal from a control circuit 21 according to an output from a pressure sensor 25 for detecting the pressure of the lower chamber 8 so that an arbitrary set pressure may be selected.

Thus, according to the present invention, since there is no accumulator in the line for the controlled output of the pressure control valve, and an accumulator is used for absorbing the high frequency component of the pressure in the lower chamber, the vehicle suspension system can favorably accommodate the movement of the wheel as it rides over a small bump on the road surface in a substantially passive manner, and the control output of the control valve can be transmitted to the hydraulic actuator without being interfered with by the presence of an accumulator. Therefore, the present invention can substantially improve the responsiveness of the vehicle suspension system without increasing the power required for operating the suspension system.

Although the present invention has been described in terms of preferred embodiments thereof, it is obvious to a person skilled in the art that various alterations and modifications are possible without departing from the scope of the present invention which is set forth in the appended claims.

What we claim is:

1. An active vehicle suspension system, comprising:
    a hydraulic actuator disposed between a wheel and a vehicle body, said actuator including a cylinder and a piston slidably received therein, said piston dividing an interior of said cylinder into first and second chambers which are defined by first and second pressure receiving surfaces of said piston, respectively, in cooperation with said cylinder;
    a pressure source;
    a first line connecting said pressure source to said first chamber;
    a control valve for controlling a pressure supplied from said pressure source to said first chamber of said cylinder;
    a second line connecting said pressure source to said second chamber;
    pressure reducing means provided in said second line for reducing a level of pressure supplied from said pressure source to said second chamber during all normal operations of the active vehicle suspension system to a level lower than a maximum pressure which said control valve can supply to said first chamber; and
    an accumulator connected to said second line;
    said first pressure receiving surface being substantially smaller than said second pressure receiving surface; and
    said control valve being adapted to control said pressure applied to said first chamber of said cylinder over a range defined between an output pressure of said pressure source anti a zero pressure.

2. An active vehicle suspension system according to claim 1, wherein said first pressure receiving surface is smaller than said second pressure receiving surface by a cross sectional area of a piston rod extending from said first pressure receiving surface of said piston out of said cylinder.

3. An active vehicle suspension system according to claim 1, wherein said pressure reducing means comprises a pilot operated pressure reducing valve whose pilot pressure is derived from a line leading to said second chamber.

4. An active vehicle suspension system according to claim 1, wherein said pressure reducing means comprises a pilot operated multi-port valve whose pilot pressure is derived from a line leading to said second chamber.

5. An active vehicle suspension system according to claim 1, wherein said pressure reducing means comprises a pilot operated multi-port valve whose pilot pressures are derived from lines leading to said pressure source and said second chamber, respectively, said valve being operated according to a difference between said pilot pressures.

6. An active vehicle suspension system according to claim 1, wherein said pressure reducing means comprises a solenoid reducing valve which is operated according an output of a pressure sensor for detecting a pressure of said second chamber.

7. An active vehicle suspension system according to claim 1, further comprising a relief valve connected a part of said second line extending between said pressure reducing means and said second chamber.

8. An active vehicle suspension system according to claim 1, further comprising an orifice provided in a part of said second line extending between said accumulator and said pressure source.

9. An active vehicle suspension system according to claim 1 wherein said second pressure receiving surface of said piston faces said wheel.

10. An active vehicle suspension system comprising:
    a hydraulic actuator disposed between a wheel and a vehicle body, said actuator including a cylinder and a piston slidably received therein, said piston dividing an interior of said cylinder into first and second chambers which are defined by first and second pressure receiving surfaces of said piston, respectively, in cooperation with said cylinder;
    a pressure source;

a first line connecting said pressure source to said first chamber;

a control valve for controlling a pressure supplied from said pressure source to said first chamber of said cylinder;

a second line connecting said pressure source to said second chamber;

pressure reducing means provided in said second line for reducing a level of pressure supplied from said pressure source to said second chamber during all normal operations of the active vehicle suspension system to a level lower than a maximum pressure which said control valve can supply to said first chamber; and an accumulator directly connected to said second line;

said first pressure receiving surface being substantially smaller than said second pressure receiving source.

11. An active vehicle suspension system according to claim 10, wherein said control valve controls said pressure applied to said first chamber of said cylinder over a range defined between an output pressure of said pressure source and a zero pressure.

12. An active vehicle suspension system according to claim 10, wherein said second pressure receiving surface of said piston faces said wheel.

13. An active vehicle suspension system according to claim 10, wherein said control valve substantially continuously controls said pressure supplied from said pressure source to said first chamber of said cylinder according to output signals of at least one of a load sensor and a stroke sensor operatively associated with said suspension system.

14. An active vehicle suspension system according to claim 1, wherein said pressure reducing means comprises a passively controlled pressure reducing vane.

15. An active vehicle suspension system according to claim 10, wherein said pressure reducing means comprises a passively controlled pressure reducing valve.

* * * * *

UNITED STATES PATENT AND TRADEMARK OFFICE
CERTIFICATE OF CORRECTION

PATENT NO. : 5,348,338
DATED : September 20, 1994
INVENTOR(S) : Kuriki et al.

It is certified that error appears in the above-indentified patent and that said Letters Patent is hereby corrected as shown below:

Column 3, line 25, change "226" to --26--.

Column 5, line 4, change "(A1/A2).(PO/2) - $\alpha \leq$ (A1/A2).(PO/2) + $\alpha$" to --(A1/A2).(PO/2) - $\alpha \leq$ Ps $\leq$ (A1/A2).(PO/2) + $\alpha$--

Column 6, line 20 (Claim 1, line 31), change "anti" to --and--;
Column 6, line 50 (Claim 7, line 2), after "connected" insert --in--.

Column 8, line 16 (Claim 14, line 3), change "vane." to --valve.--

Signed and Sealed this

Fifteenth Day of November, 1994

Attest:

BRUCE LEHMAN

*Attesting Officer*  *Commissioner of Patents and Trademarks*